March 2, 1965     J. J. FINN ETAL     3,171,158
HEATING ELEMENT HINGE ASSEMBLY HAVING OPPOSED CHANNELED ARMS
Filed Sept. 12, 1960     2 Sheets-Sheet 1
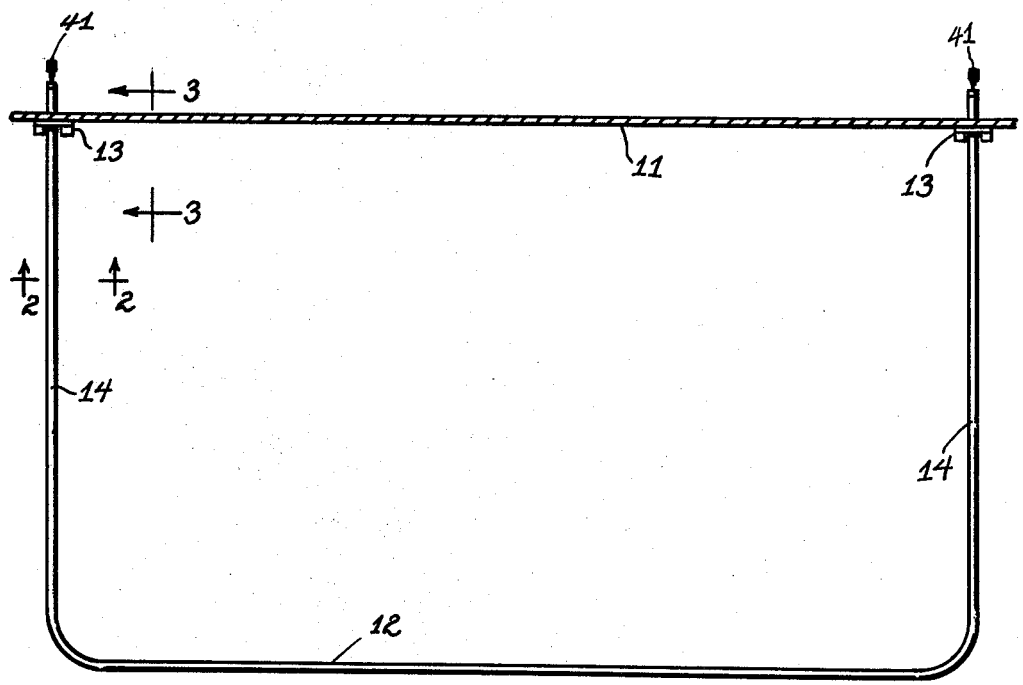
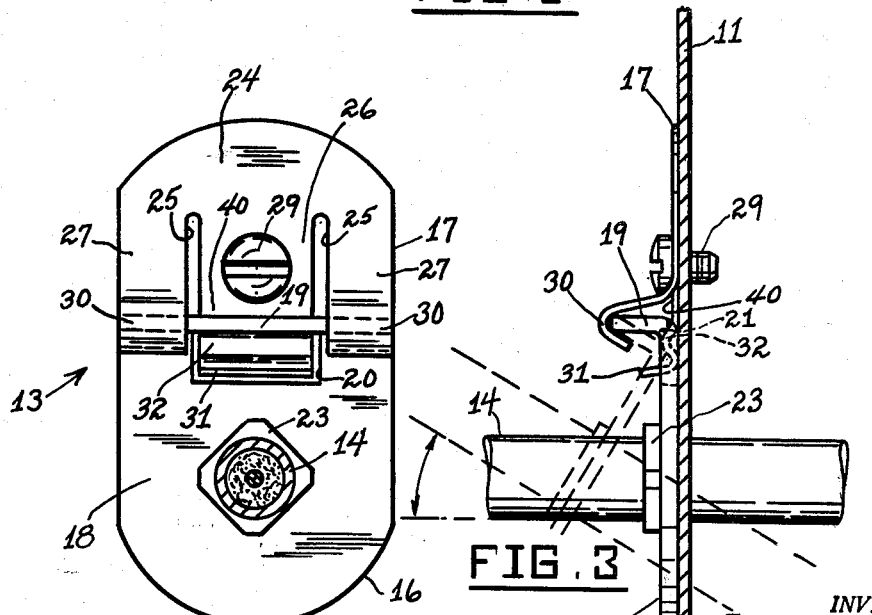
INVENTORS
JOHN J. FINN
EBERHARD MENG
BY 
ATTORNEY

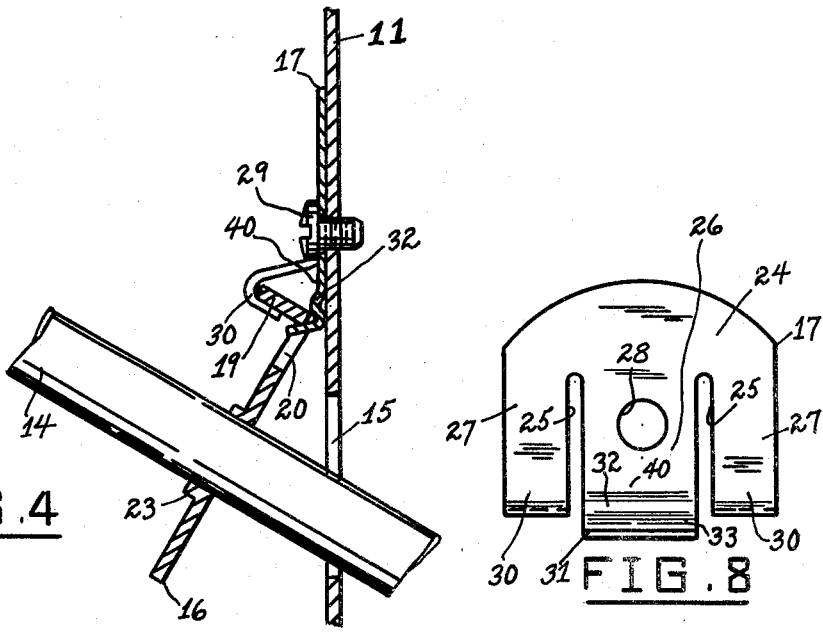
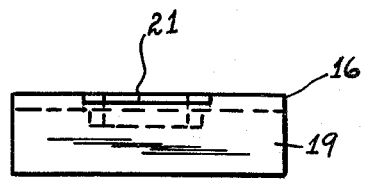
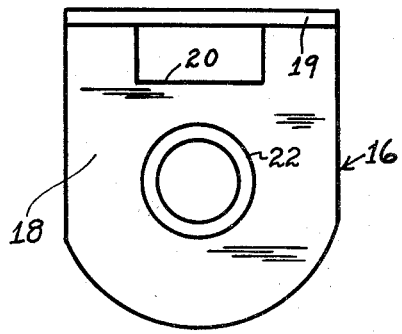
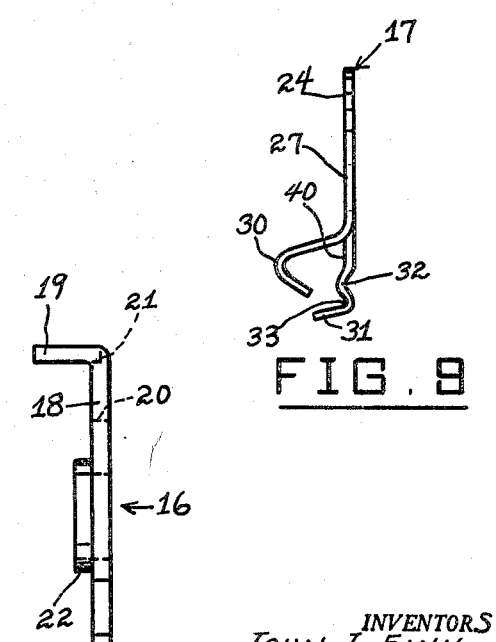
March 2, 1965     J. J. FINN ETAL     3,171,158
HEATING ELEMENT HINGE ASSEMBLY HAVING OPPOSED CHANNELED ARMS
Filed Sept. 12, 1960     2 Sheets-Sheet 2
INVENTORS
JOHN J. FINN
EBERHARD MENG
BY Herman L. Gordon
ATTORNEY

United States Patent Office 3,171,158
Patented Mar. 2, 1965

3,171,158
HEATING ELEMENT HINGE ASSEMBLY HAVING OPPOSED CHANNELED ARMS
John J. Finn, Rockville, Md., and Eberhard Meng, Washington, D.C., assignors to Electro-Therm, Inc., Silver Spring, Md.
Filed Sept. 12, 1960, Ser. No. 55,567
3 Claims. (Cl. 16—142)

This invention relates to electric ovens, and more particularly to a hinged electrical heating element for use in an oven.

A main object of the invention is to provide a novel and improved hinged electric oven heating unit which is simple in construction, which is easy to install, and which is arranged so that the heating element thereof may be at times rotated to an inclined position and will be held in said position, to permit access to the space normally covered by said element to permit cleaning thereof.

A further object of the invention is to provide an improved hinged electric oven heating unit which employs relatively inexpensive parts, which is durable in construction, and which is reliable in operation.

A still further object of the invention is to provide an improved supporting hinge assembly for an electric oven heating element, the assembly being arranged to support the heating element either in its normal substantially horizontal position, or in an inclined position to provide access to the space normally covered by the element, the assembly being yieldable to allow the element to be rotated from one position to another and being provided with locking means to hold the element in its selected position until it is manually rotated from said selected position.

Further objects and advantages of the invention will become apparent from the following description and claims, and from the accompanying drawings, wherein:

FIGURE 1 is a horizontal cross-sectional view taken through the rear wall of an electric oven provided with an improved hinged heating element according to the present invention and showing the heating element in top plan view.

FIGURE 2 is an enlarged vertical cross-sectional view taken substantially on the line 2—2 of FIGURE 1.

FIGURE 3 is an enlarged vertical cross-sectional view taken substantially on the line 3—3 of FIGURE 1.

FIGURE 4 is an enlarged vertical cross-sectional view taken centrally through one of the hinge bracket assemblies employed with the heating element of FIGURE 1, but showing the heating element in an elevated inclined position.

FIGURE 5 is a top plan view of the lower bracket member of the hinge bracket assembly of FIGURES 3 and 4.

FIGURE 6 is a front elevational view of the lower bracket member of FIGURE 5.

FIGURE 7 is a side elevational view of the bracket member of FIGURES 5 and 6.

FIGURE 8 is a front elevational view of the upper bracket member of the hinge bracket assembly of FIGURES 3 and 4.

FIGURE 9 is a side elevational view of the upper bracket member shown in FIGURE 8.

Referring to the drawings, 11 designates the vertical rear wall of an oven, and 12 designates a generally U-shaped electric heating element disposed in the oven and hingedly connected to rear wall 11 by respective hinge bracket assemblies 13, 13 at the rear end portions of the side legs 14, 14 of the heating element. The rear portions of said side legs project through respective openings 15 provided in rear wall 11, and the legs are provided at their rear ends with respective terminals 41, 41 for electrically connecting the element to a source of current.

Each hinge bracket assembly 13 comprises a relatively rigid lower bracket member 16 and a relatively resilient upper bracket member 17. The lower bracket member 16 comprises a main plate-like body portion 18 formed at its top edge with a forwardly projecting rectangular flange 19 which extends for the full width of the body portion 18, as shown in FIGURE 6. The upper portion of main body 18 is formed centrally with a rectangular aperture 20 located beneath the intermediate portion of flange 19, and the rear edge of said flange intermediate portion is rearwardly exposed but is slightly offset forwardly from the rear vertical plane of said main body 18 at the top of the aperture 20, as shown at 21.

Main body 18 is formed with an integral initially annular collar portion 22 in which a leg 14 of the heating element is secured, as by squeezing the collar portion inwardly to deform same around the leg to provide the resulting generally octagonal configuration shown at 23 in FIGURES 2 and 3.

The legs 14, 14 are thus rigidly secured to the lower bracket members 16, 16 in perpendicular relation thereto.

Each upper bracket member 17 comprises a main body 24 of spring metal, formed with a pair of vertical slots 25, 25 open at their bottom ends and defining a pair of resilient side arms 27, 27 and a central resilient tongue element 26 located between said side arms. An aperture 28 is provided in the upper portion of the central tongue element 26 to receive a suitable fastening member, for example, a sheet metal screw 29, for fastening the bracket member 17 to the rear wall 11, as shown in FIGURE 4. The bracket members 17, 17 are thus secured in horizontal alignment to the oven rear wall 11.

Each resilient side arm 27 is formed at its lower end with a rearwardly facing, generally V-shaped hook element 30. The central tongue element 26 extends below the hook elements 30 and is formed with a downwardly and forwardly inclined bottom flange 31 and with a transverse corrugation 32 immediately above said flange, defining a forwardly facing transverse channel 33 between the flange and the corrugation.

The end portions of flange 19 are received in the hook elements 30, 30 and the lower portion of the central tongue element 26 is engaged behind the exposed rear intermediate edge portion 21 of flange 19, the lower portion of the tongue element being received in the rectangular aperture 20 of the associated lower bracket member 16, as shown in FIGURES 2 and 4. In the normal horizontal position of the heating element 12, shown in FIGURE 3, the rear edge portions 21 of the flanges 19 are supported on the upper surfaces of the corrugations 32, the front edges of flanges 19 engaging in the hook elements 30. When the heating element is rotated upwardly from the full-line position thereof shown in FIGURE 3 to the dotted view position thereof, the rear edge portions 21 of flanges 19 slide downwardly over the corrugations 32, flexing hook elements 30 outwardly, and engage in the channels 33, the front edges of flanges 19 pivoting in hook elements 30. Flanges 19 are thus yieldably locked in inclined positions, as shown in FIGURE 4. The heating element 12 is thus supported in an upwardly and forwardly inclined position, providing access to the space therebelow for cleaning.

The heating element 12 may be returned to its normal horizontal position by manually rotating it downwardly, the tongue elements 30 being yieldable to allow flanges 19 to rotate to positions wherein the rear edge portions 21 thereof engage on the top portions of the transverse corrugations 32.

It will be noted that the transverse corrugations 32 are spaced sufficiently below the fastening screws 29 to provide ample space for the reception of the flanges 19 horizontally between the surface portions 40, immediately above the corrugations, and the hook-like members 30 when the heating element is in its horizontal normal position, shown in FIGURE 3.

The bracket assemblies may be mounted in inverted positions when the heating element is to be mounted in the top portion of the oven. This permits the heating element to be swung downwardly, providing access to the space above the heating element for cleaning.

While a specific embodiment of an electric oven hinged heating element assembly has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a hinge assembly, a rigid first bracket member comprising a vertical main plate-like body portion formed at its top edge with a forwardly projecting marginal flange, said main body being formed substantially centrally with an aperture located beneath the intermediate portion of said flange, the rear edge of the flange intermediate portion being exposed and substantially defining the top edge of said aperture, and a second bracket member comprising a vertical main body of spring metal formed with a pair of spaced vertical slots open at their bottom ends and defining a pair of resilient side arms and a central tongue element located between said side arms, each side arm being formed at its lower end with a rearwardly facing generally V-shaped hook element, the central tongue element extending below the hook elements and being formed with a downwardly and forwardly inclined bottom flange and with a transverse corrugation immediately above said bottom flange, defining a forwardly facing transverse channel between the last-named flange and the corrugation, the end portions of the first-named flange being received in said hook elements and the lower portion of the central tongue element being engaged behind the exposed rear intermediate edge portion of the first-named flange and being received in said aperture, said rear edge portion of the first-named flange being normally supported on the upper surface of said corrugation but being slidable downwardly over the corrugation and engageable in said channel responsive to upward rotation to an inclined position of said first bracket member around the pivots defined by the front edge portions of said first-named flange and said hook elements, whereby to yieldably lock said first bracket member in said inclined position.

2. The structure of claim 1, and wherein said exposed rear edge of the first-named flange is substantially straight and extends longitudinally of said first-named flange.

3. The structure of claim 2, and wherein said exposed rear edge of the first-named flange is offset forwardly from the rear vertical plane of said first-named vertical main plate-like body portion.

References Cited by the Examiner
UNITED STATES PATENTS

| | | | |
|---|---|---|---|
| 2,751,487 | 6/56 | Vallorani et al. | 219—463 |
| 2,799,042 | 7/57 | Hollansworth | 16—142 |
| 2,824,944 | 2/58 | Ammerman | 219—403 |

RICHARD M. WOOD, *Primary Examiner.*

MAX L. LEVY, *Examiner.*